Patented Oct. 23, 1934

1,977,662

UNITED STATES PATENT OFFICE 1,977,662

PROCESS OF HALOGENATING PYRIDINES

Johan Pieter Wibaut and Herman Johannes den Hertog, Jr., Amsterdam, Netherlands, assignors to The Dow Chemical Company, Midland, Mich., a corporation of Michigan No Drawing. Application May 20, 1932, Serial No. 612,634. In the Netherlands May 21, 1931

10 Claims. (Cl. 260—42)

This invention relates to the manufacture of brominated or chlorinated pyridines from pyridine in gaseous condition and gaseous bromine or gaseous chlorine.

It is known that bromo- or chloropyridines are formed by the direct action of halogen or of phosphoric halides on pyridine, but no one of the methods followed in these investigations has appeared to be suitable for manufacturing bromo- or chloropyridines in large quantities.

When pyridine or its hydrochloride or hydrobromide is subjected to the action of chlorine or bromine at room temperature, perchlorides or perbromides are formed, whilst part of the pyridine changes into a resinous mass (Anderson, Lieb. Ann. 105, 310 (1858), Hoffmann, Ber. 12, 984 (1879), Trowbridge and Diehl, J. Am. Chem. Soc. 19, 558, (1897)). In this way only very small quantities of substitution products are formed (Keiser, J. Am. Chem. Soc. 8, 310 (1886), Sell and Dootson, J. Chem. Soc. 73, 442 (1898), Reitzenstein and Breuning, J. Prakt. Chem. (2), 83, 99 (1911)). Sell and Dootson obtained a mixture of di- and higher substituted pyridines, when they heated pyridine with phosphorus pentachloride at 210°–220° in sealed tubes (J. Chem. Soc. 73, 432 (1898)). 3-bromopyridine (β-bromopyridine) and 3,5-dibromopyridine (β,β'-dibromopyridine) were obtained by heating the hydrochloride of pyridine with bromine at 200° for several hours in sealed tubes (Hofmann, Ber. 12, 984 (1879)).

Although the preparation of halogenopyridines, substituted in positions 3 or 3 and 5, is possible in this manner, the method mentioned does not appear to be suitable for the manufacture of large quantities. Chloro- and bromopyridines, substituted in position 2 (α), which, from a manufacturing point of view, are of greater importance, and could only be obtained from pyridine as a starting material by indirect methods, viz. 2-aminopyridine or 2-pyridon being an intermediate substance.

We have found that the direct bromination of pyridine proceeds very satisfactorily, when bromine and pyridine are allowed to react in the gaseous phase at temperatures between 150° and 650°. It was found necessary to preheat the vapors of bromine and pyridine separately, before they are mixed in the reaction space, whereas separation of carbon and other undesirable reactions occur if bromine and pyridine come into contact with each other before they are heated up to the reaction temperature. In this way the halogenation smoothly proceeds at a temperature of 300°, when the reaction space is filled up with a suitable contact substance, such as pumice, charcoal etc. In an empty tube the halogenation reaction does not take place or only to a slight extent at this temperature, whilst other reactions occur, converting the pyridine into ill-defined products. A contact substance such as pumice also may be recommended when the bromination is carried out at 500°, although at this temperature a satisfactory result is also obtained when an empty tube is used.

It also depends on the reaction temperature in which position of the pyridine nucleus the bromine atoms are substituted. Whereas at 300° a mixture of 3-bromopyridine and 3,5-dibromopyridine, besides a small quantity of higher-brominated pyridines, is obtained, at 500° 2-bromopyridine and also 2,6-dibromopyridine are formed. This result is very surprising, since, up to now, no examples of halogenation reactions in aromatic or heterocyclic nuclei are known, wherein the course of the halogenation can be altered totally by a change of the reaction temperature. By the application of this method it is therefore possible to manufacture bromopyridines, in which the bromine atoms are substituted either in positions 2 (or 2 and 6) or in positions 3 (or 3 and 5).

We also have investigated, whether by bromination of 3-bromopyridine at 500°, or of 2-bromopyridine at 300° it would be possible to obtain isomers of the above-mentioned di-bromopyridines and higher brominated pyridines.

By these experiments we discovered, that the course of the halogenation reaction at one and the same temperature can be altered by the use of certain contact substances.

Whereas, at 300°, in the presence of pumice as a contact substance, substitution takes place in positions 3 and 5, at this same temperature the halogenation takes place in positions 2 and 6 when pumice impregnated with certain metallic bromides, such as cupric or cuprous bromide, is used as a contact substance. With the use of pumice, impregnated with other metallic bromides, such as ferric and ferrous bromide or zinc bromide, however, the halogenation in positions 3 and 5 is favored. This is particularly of importance for those bromopyridines, which cannot be further brominated at 300° in the presence of non-impregnated pumice.

Brominating with a pumice-copper bromide contact at 300° we obtained e. g. from 2-bromopyridine: 2,6-dibromopyridine besides higher brominated pyridines, from 3-bromopyridine: 3,5- dibromo-pyridine and from 3,5-dibromopyridine: 2,3,5-tribromopyridine.

With the use of a pumice-iron bromide contact at 300° we obtained from 2-bromopyridine: 2,5-dibromopyridine and 2,3,5-tribromopyridine, whilst with the same contact from 2,6-dibromopyridine 2,3,6-tribromopyridine and 2,3,5,6-tetrabromopyridine were formed.

As we mentioned before, at 500° the hydrogen atoms of the pyridine nucleus are substituted by bromine in positions 2 and 6 in the presence of a contact substance such as pumice. The further halogenation of bromopyridines, (substituted) in positions 3 or 3 and 5, at 500° occurs in positions 2 and 6, whilst a third bromide atom is substituted in position 4 if the positions 2 and 6 are already occupied by bromine.

At 500°, in the presence of pumice, we obtained e. g. from 3-bromopyridine: 3,6-dibromopyridine and 2,3,6-tribromopyridine, from 3,5-dibromopyridine: 2,3,5-tribromopyridine and 2,3,5,6-tetrabromopyridine. In the same way 2,4,6-tribromopyridine was obtained from 2,6-dibromopyridine.

The chlorination of pyridine according to this method proceeds less smoothly than the bromination. When a mixture of chlorine and pyridine vapor is passed over a contact substance such as charcoal, asbestos or pumice, a reaction product is obtained, which consists of monochloropyridines (chiefly 2-chloropyridine) and higher chlorinated pyridines, e. g. 3,5- and 2,6-dichloropyridine and pentachloropyridine.

The method described may be applied to the halogenation of pyridine derivatives, containing no halogen, e. g. 2-aminopyridine.

*Example I.*—In a vertical reaction tube (internal diameter: 3 cm.; heated over a length of 55 cm.) an inner tube is connected; the outlet of the inner tube is at one-third of the length of the heated part of the reaction tube. The lower part of the reaction tube is filled up with small pieces of pumice. Bromine is dropped through the inner tube, whilst pyridine is dropped through a side tube into the annular space between the inner tube and the wall of the reaction tube.

In 20 hours 240 g. of pyridine and 625 g. of bromine were passed through the tube at a reaction temperature of 300°. In the receiver which was fixed to the end of the tube, a very viscous liquid of dark red color condensed, which was rendered slightly alkaline with a solution of sodium carbonate and distilled with steam. The first fraction (200 g.) contained an oily liquid, the second (100 g.) consisted of a mixture of an oil and crystals of 3,5-dibromopyridine. From these fractions almost 200 g. of 3-bromopyridine (b. p. 174°) could be isolated by vacuum distillation, the rest consisting practically of 3,5-dibromopyridine (m. p. 110°-111°); only a small quantity of higher-brominated pyridines was present.

*Example II.*—150 g. of pyridine and 475 g. of bromine were passed in 8 hours through the reaction tube, described in Example I, at a reaction temperature of 500°. From the reaction product were obtained 130 g. of 2-bromopyridine (b. p. 193°) and 150 g. of 2,6-dibromopyridine (m. p. 118°-119°).

*Example III.*—A mixture of 60 g. of 2-bromopyridine and 130 g. of bromine was passed in 6 hours at 300° over pumice impregnated with cuprous bromide; 20-25 g. of 2,6-dibromopyridine and 5-10 g. of higher brominated pyridines, containing a considerable amount of pentabromine pyridine, were obtained, whereas, 40 g. of 2-bromopyridine were recovered.

*Example IV.*—A mixture of 19 g. of 2,6-dibromopyridine and 12,5 g. of bromine was passed in half an hour at 300° over pumice impregnated with ferrous bromide; 7,5 g. of 2,3,6-tribromopyridine and 1,5 g. of 2,3,5,6-tetrabromopyridine were obtained, whilst 8 g. of 2,6-dibromopyridine were recovered.

What we claim is:

1. The process for the manufacture of a halogenated pyridine which includes, heating to a gaseous phase a halogen of the class consisting of chlorine and bromine, independently heating to a gaseous phase a pyridine and subsequently effecting a reaction between the said components while in their gaseous phases.

2. The process according to claim 1, in which the range of temperature is 150° to 650° C.

3. The process according to claim 1 in which the range of temperteure is 300° to 500° C. and which is conducted in the presence of a halogenation contact substance.

4. The process according to claim 1 in which a contact substance, impregnated with a metal halide halogenation catalyst, is employed.

5. Process for the manufacture of brominated pyridine which comprises, effecting a reaction between bromine and pyridine in their gaseous phases after they have first been heated to their gaseous phases independently.

6. Process according to claim 5, in which the range of temperature is 500° to 650° C.

7. The process of manufacturing 3,5-dibromopyridine and 3-bromopyridine which comprises heating bromine and pyridine separately to a reaction temperature of 300° C. and subsequently effecting a reaction between the bromine and pyridine at the same temperature in the presence of pumice.

8. The process for the manufacture of 2-bromopyridine and 2,6-dibromopyridine which comprises heating bromine and pyridine separately to a reaction temperature of 500° C. and subsequently effecting a reaction between the bromine and pyridine at the same temperature in the presence of pumice.

9. In a method of making a halogenated pyridine, the step which consists in mixing vapors of a pyridine with vapors of a halogen selected from the class consisting of chlorine and bromine, said pyridine and halogen vapors being at such temperature that reaction occurs spontaneously after mixing.

10. In a method of making a halogenated pyridine, the steps which consist in mixing vapors of a pyridine with vapors of a halogen selected from the class consisting of chlorine and bromine and reacting the resultant vapor mixture at a temperature between about 150° and about 650° C.

JOHAN PIETER WIBAUT.
HERMAN JOHANNES DEN HERTOG, JR.